United States Patent [19]

Eggers et al.

[11] 4,146,662
[45] Mar. 27, 1979

[54] WARP AND WEATHER RESISTANT SOLID CORE WOOD DOOR AND METHOD OF MAKING

[75] Inventors: Philip R. Eggers, Fall City; Elwood K. Madsen, Seattle, both of Wash.

[73] Assignee: Simpson Timber Company, Seattle, Wash.

[21] Appl. No.: 873,417

[22] Filed: Jan. 30, 1978

[51] Int. Cl.² .................... B32D 1/04; B32D 3/02
[52] U.S. Cl. ............................ 428/68; 156/220; 428/187; 428/528; 428/535
[58] Field of Search .................... 52/309.15; 156/220; 428/153, 187, 337, 514, 106, 45, 68, 528, 535

[56] References Cited

U.S. PATENT DOCUMENTS

| 3,738,900 | 6/1973 | Matzke | 52/615 |
| 3,994,110 | 11/1976 | Ropella | 52/615 |

*Primary Examiner*—John E. Murtagh
*Attorney, Agent, or Firm*—Seed, Berry, Vernon & Baynham

[57] ABSTRACT

A specially constructed solid core door is disclosed having a solid core material of particleboard or other suitable material, wood stiles bonded around the periphery of the edges of the core material, a hardwood skin having a minimum thickness of ⅛ inch bonded to the front and rear surfaces of the core material and a phenolic resin-impregnated paper overlay overlying and bonded to the exposed faces and backs of each of the hardwood veneers. The exposed face of the resin-impregnated paper is preferably deeply embossed during bonding of the paper to the veneer with a texture such as a wood grain texture. The door has twice the warp resistance of standard wood doors. The resin impregnated overlayed surfaces provide excellent dent resistance, easy repairability, resistance to checking or crazing, and long paint life (approximately 2 to 3 times that of the standard wood faced door).

6 Claims, 2 Drawing Figures

WARP AND WEATHER RESISTANT SOLID CORE WOOD DOOR AND METHOD OF MAKING

BACKGROUND OF THE INVENTION

1. Field of the Invention

This invention relates to a weather and warp resistant solid core wood door for domestic and commercial uses.

2. Description of the Prior Art

Standard solid core wood doors for exterior use are made of generally of a solid core material with a veneer overlay bonded to the front and rear exposed surfaces. When such doors are exposed to weather, even if the exposed surfaces are protected by protective coatings, they frequently check and warp. Extensive use is made of steel doors as exterior doors; however, the exposed surfaces of such steel doors are subject to dents and rust unless adequately protected by protective coatings. Further, steel doors are not stainable to give the often desired natural wood grain nor are they embossable to the final degree possible with the subject invention.

SUMMARY OF THE INVENTION

The primary object of this invention is to provide a specially constructed solid core door having phenolic resin impregnated overlayed surfaces bonded to hardwood veneer under heat and pressure, the overlayed laminate of resin-impregnated paper and veneer then bonded to both the front and rear surfaces of a core material such as particleboard to which wood stiles, preferably of a minimum width of 2¼ inches have been bonded.

It is a further object of this invention to provide a solid core wood door suitable for exterior use having twice the warp resistance of standard wood doors.

It is a further object of this invention to provide a solid core wood door which is easily repaired if scratched, is not subject to checking or crazing on exposure to weather conditions, has excellent dent resistance and can be either stained or painted.

It is a further object of this invention to provide a solid core wood door whose exposed surfaces can be deeply embossed during bonding of the phenolic resin impregnated overlay paper to the hardwood veneer to give a natural woodgrain texture or other desired texture to the door.

These and other objects are accomplished by bonding a phenolic resin impregnated paper overlay to the exposed faces and backs of hardwood veneer skins under heat and pressure, preferably using an embossed caul plate on the exposed face to impart a texture to the exposed surface of the phenolic resin impregnated paper overlay, and bonding the paper/veneer laminate to a solid core material such as particle-board or synthetic foam to which wood edge strips, preferably of a minimum thickness of 2¼ inches.

DETAILED DESCRIPTION OF THE PREFERRED EMBODIMENTS

Figure 1:
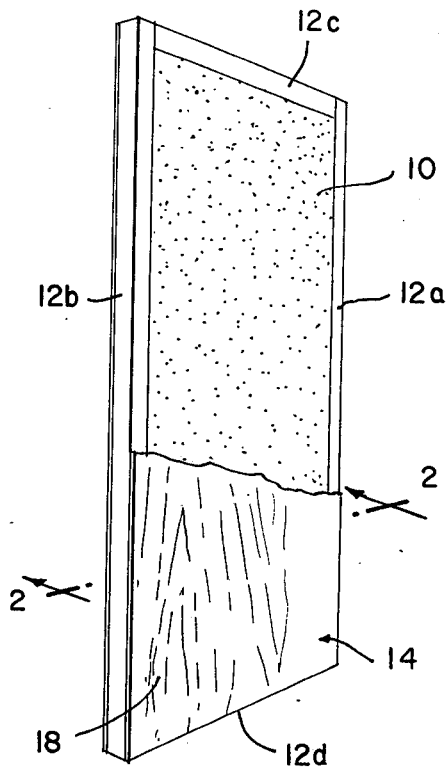
FIG. 1 is perspective drawing of the door of this invention with a portion thereof broken away showing the interior of the door.
Figure 2:
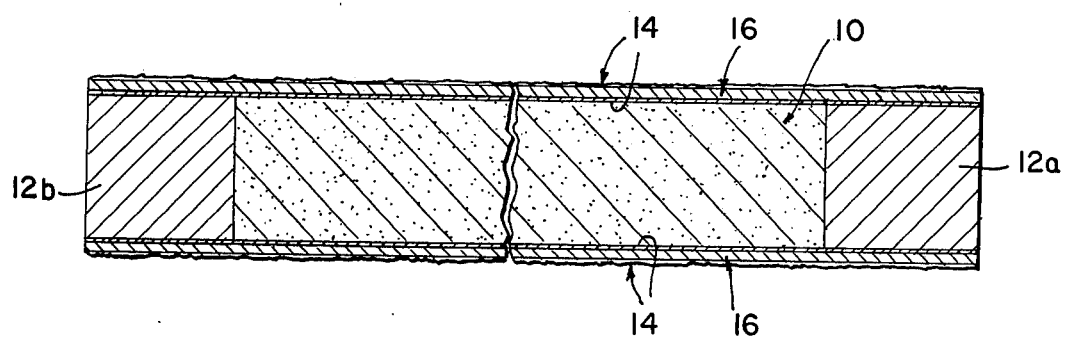
FIG. 2 is a cross section of the door of FIG. 1 along section line 2—2.

The specially constructed solid core door is shown in perspective in FIG. 1. Such doors are generally designed for commercial or domestic use and usually have a height of 6'8" and varying widths ranging from 2'6" to 3' and a thickness ranging from 1½ to 2½ inches.

The core material of the door is preferable a solid particleboard core material with a minimum 28 lb/ft$^3$ density. Other core materials such as synthetic foam materials may be used if their use does not adversely affect the performance of the door. The solid core material is framed with wood strips 12 of a thickness sufficient to resist warpage of the door. The side stile strips 12a and 12b preferably have a minimum width of 2¼ inches and the top and bottom edge strips 12c and 12d preferably have a width of 2½ inches or greater.

The phenolic resin-impregnated overlay paper 14 does not form a part of this invention and is a commercially available product. The material used is preferably a medium density overlay paper manufactured by Simpson Timber Company although other resin-impregnated paper materials may be used. The overlay paper manufactured by Simpson Timber Company comprises a cellulosic fiber sheet material impregnated with 28% to 35% ash-free phenolic resin solids. The resin-impregnated overlay 14 is coated on one side with a conventional phenolic adhesive and then bonded by heat and pressure to both exposed faces a sheet of hardwood veneer 16 having, preferably, a minimum thickness of 3 mm. The adhesive is applied to the overlay paper at room temperature and dried to the non-tacky state. Bonding of the overlay paper to the veneer is generally performed in a heated press at a pressure of from 150 to 250 psi at a temperature of about 285° F. for a period of about 7 minutes. During the heating and pressing cycle the resin impregnated in the paper is cured as well as the phenolic adhesive.

During bonding of the overlay paper to the hardwood veneer, the caul plate used for bonding one of the overlays to the hardwood preferably has a textured surface so as to impart a deeply embossed textured surface 18 to the exposed face of resin impregnated overlay paper 14 during the bonding operation. Any type of design can be used. A favored design is a natural rough-sawn wood grain surface so that the door has the general appearance of a wooden door when stained or painted. The hardwood veneer with the overlay bonded to both the face and back surfaces is then adhesively bonded with a phenolic adhesive or other suitable waterproof adhesive to the solid core material 10.

The width of the edge strips 12 and the use of door skins which are hardwood veneer faced on both sides with phenolic resin-impregnated overlay sheets bonded to the core material gives a finished door with excellent warp resistance. Also, the resin-impregnated overlayed surface provide excellent dent resistance while not impairing on-site work which can be done with normal wood-working tools. The doors are easily repaired if scratched. Additionally, the resin impregnated overlayed surface provides checking and crazing resistance no matter what the weather conditions. The doors meet all thermal code requirements for insulation.

The ability to deeply emboss the exposed surfaces of the door during fabrication of the doors also results in a door of natural beauty, long life and economy.

We claim:

1. A weather and warp-resistant decorative solid core wood door comprising:
   a rectangular solid core material having exposed front and rear faces,
   wooden stiles framing the sides of the core material, and top and bottom rails framing the top and bottom edges of the core material,
   hardwood plywood veneer skins whose front and rear surfaces are each bonded to phenolic resin-impregnated paper overlays under heat and pressure, the overlayed veneer skins adhesively bonded to the exposed front and rear faces of the core material and over the wooden stiles and rails.

2. The solid core wood door of claim 1 wherein the core material is particleboard having a minimum density of 28 pounds/ft.$^3$.

3. The solid core wood door of claim 1 wherein the exposed surface of each of the phenolic resin-impregnated overlay veneer skins bonded to the core material are deeply embossed during bonding of the resin-impregnated overlay paper to the veneer skin to provide a textured design thereon.

4. A method of making a weather and warp resistance decorative solid core wood door comprising:
   providing a hardwood plywood veneer skin, having exposed front and rear surfaces,
   providing an uncured phenolic resin impregnated, cellulosic paper overlay coated on one surface thereof with an uncured phenolic adhesive resin,
   bonding the adhesive coated surface of the phenolic resin-impregnated paper to the exposed front and rear faces of the hardwood veneer skin under heat and pressure sufficient to cure the adhesive coating and the phenolic resin impregnated into the paper overlay, and
   bonding the hardwood veneer/phenolic resin-impregnated paper overlay laminate to the exposed front and rear faces of a core material framed with wooden stiles.

5. The method of claim 4, including deeply embossing the exposed face of the resin-impregnated paper overlay during bonding of the paper overlay to the hardwood veneer skin to provide a decorative surface which is stainable and/or paintable.

6. The solid core wood door of claim 1 wherein the stiles have a minimum width of two and one-quarter inches and the rails have a minimum width of two and one-half inches.